TELEPHONE LINE SCANNING CIRCUIT

Filed March 8, 1960

INVENTORS: M. E. ALTERMAN
E. A. IRLAND
BY Henry M. Bissell
ATTORNEY

INVENTORS M. E. ALTERMAN
E. A. IRLAND
BY Henry M. Bissell
ATTORNEY

INVENTORS M. E. ALTERMAN
E. A. IRLAND
BY Henry M. Bissell
ATTORNEY

INVENTORS M. E. ALTERMAN
E. A. IRLAND
BY Henry M. Bissell
ATTORNEY

INVENTORS M. E. ALTERMAN
E. A. IRLAND
BY Henry M. Bissell
ATTORNEY

Jan. 15, 1963 M. E. ALTERMAN ET AL 3,073,907

TELEPHONE LINE SCANNING CIRCUIT

Filed March 8, 1960 6 Sheets-Sheet 6

INVENTORS M.E. ALTERMAN
E.A. IRLAND
BY Henry M. Bissell
ATTORNEY 3,073,907
Patented Jan. 15, 1963

3,073,907

TELEPHONE LINE SCANNING CIRCUIT

Michael E. Alterman, New Providence, and Edwin A. Irland, Hanover, N.J., assignors to Bell Telephone Laboratories, Incorporated, New York, N.Y., a corporation of New York Filed Mar. 8, 1960, Ser. No. 13,649
21 Claims. (Cl. 179—18)

This invention relates to telephone communication systems and more particularly to a line scanning circuit for such a system.

It has long been customary in telephone communication systems to provide equipment for recognizing a change in the condition of the switch hook at the telephone subscriber's set. Such a change in switch-hook condition corresponds to a request for service to initiate or terminate a telephone connection. A corresponding indication is needed, therefore, to initiate steps to provide the requested service.

Conventionally, in electromechanical telephone switching systems the line, or switch-hook, condition is indicated by the contact condition of a line relay controlled by the switch hook. With the advent of high speed electronic telephone switching systems other devices have been utilized to perform this function. It is known in the electronic switching art to scan subscriber telephone lines on a periodic basis in order that service requests may be detected as they occur. Customarily in electronic telephone systems each indication of line condition is compared with the previous indication of that line's condition, derived from the previous scan and stored in a scanner memory, to ascertain if a line condition change has occurred. In the event that it has, the line is identified by a resort to its memory address and the procedure to provide the requested service is initiated.

It is an object of this invention to provide an improved line scanner circuit for an electronic telephone switching system.

More specifically, it is an object of this invention to eliminate the need for an independent scanner memory in an electronic switching system.

A further object of this invention is to eliminate the need for resorting to the line scanner memory of an electronic telephone switching system in order to identify a particular line undergoing a change in condition.

One specific embodiment of this invention has been developed for use in a private branch exchange (PBX) of an electronic telephone communication system to generate information regarding a specific line at a remote location which may be transmitted to common control equipment located in the central office. It will be clear, however, that the invention is not limited to such a use. In fact, the line scanner circuit of this invention may be employed in systems other than telephone communication systems if such is desired.

In the context in which this invention is described herein a plurality of telephone lines is to be periodically scanned at a rapid rate and the identification of a line requiring attention is to be supplied to the information transfer system disclosed in copending application Serial No. 13,464 of E. A. Irland, filed March 8, 1960, for eventual transmission to common control equipment.

In this embodiment of the invention, each subscriber line has an individual line circuit associated with it for line condition change detection purposes. This line circuit essentially comprises a bistable multivibrator, or flip-flop, and a reverse voltage breakdown diode. The flip-flop is of a type known in the art having dual input and output leads. When a signal is applied to one input lead, the flip-flop assumes one of its two stable states and produces a signal on one output lead. Similarly, when a signal is applied to the other input lead, the flip-flop assumes its other stable state and produces a signal on its other output lead. The conduction state of the reverse voltage breakdown diode corresponds to the condition of its associated line, it being rendered conducting in the reverse direction when the associated switch hook is open and non-conducting when the switch hook is closed.

A scanning signal is applied to both input leads of the line circuit flip-flop through individual capacitors which establish particular time constants which are determinative of the time delays of the two input signal paths. However, the scanning signal applied to one of the input paths is directed through the reverse breakdown diode. Thus, the reverse breakdown diode affects the time constant of the input signal path with which it is in series. Since the time durations of the pulses passed over the respective input signal paths are proportional to the path time constants, it can be seen that the reverse breakdown diode, in accordance with an aspect of this invention, determines the relative durations of the signals over the respective paths. While the diode is conducting, its input signal path has the longer time constant so that the scanning pulse directed along this path determines the state of the flip-flop. When the reverse breakdown diode is not conducting, it acts as a small capacitance in series with its input signal path, materially reducing the time constant thereof. Accordingly, the scanning pulse directed along the other input signal path establishes the other flip-flop state and an output signal is developed which indicates that the associated line has changed condition since the last time it was scanned. In this manner, a change of line condition is indicated without the necessity of referring to a separate scanner memory for comparison.

In accordance with the invention, the periodic scanning of the respective line circuits is effected by a transistor tree selector controlled by a recycling binary counter which is driven by an astable multivibrator clock. When the particular line circuit being scanned signals a change of line condition, the line change detector connected in common to all of the line circuits of the scanner applies an inhibiting signal to the clock, thus interrupting the cycle of the binary counter. The counter therefore maintains a circuit condition corresponding to that particular line circuit address until the clock inhibiting signal is removed. During this interval, the line circuit address is passed from the binary counter to the information transfer system of the above-cited Irland application. When that address has been transferred, a return signal is received which causes the line change detector to remove its inhibiting signal from the clock, thereby permitting the resumption of line scanning.

It is a feature of this invention that the state of a flip-flop be determined by the time constants of its respective input leads in response to an input signal applied to a common point.

It is another feature of this invention that a reverse breakdown diode be used to develop one time constant for a current path in which it is included when it is conducting and another time constant for this path when it is not conducting.

It is a more specific feature of this invention that the shunt capacitance of a reverse breakdown diode in its non-conducting state be employed to reduce the time constant of a capacitive network with which it is in series.

It is a further feature of this invention that a telephone line circuit produce a signal indicative of a change of line condition in response to an applied line scanning pulse.

It is another feature of this invention to develop a line circuit scanning signal by the use of a coordinate matrix, the coordinates of which are driven by separate stages of a binary counter.

It is another feature of this invention to derive the address of a particular line circuit from a recycling binary counter whose count cycle is interrupted by a signal from the particular line circuit.

A complete understanding of this invention and of these and various other features thereof may be gained from consideration of the following detailed description and the accompanying drawing in which.

Figures 1, 7:
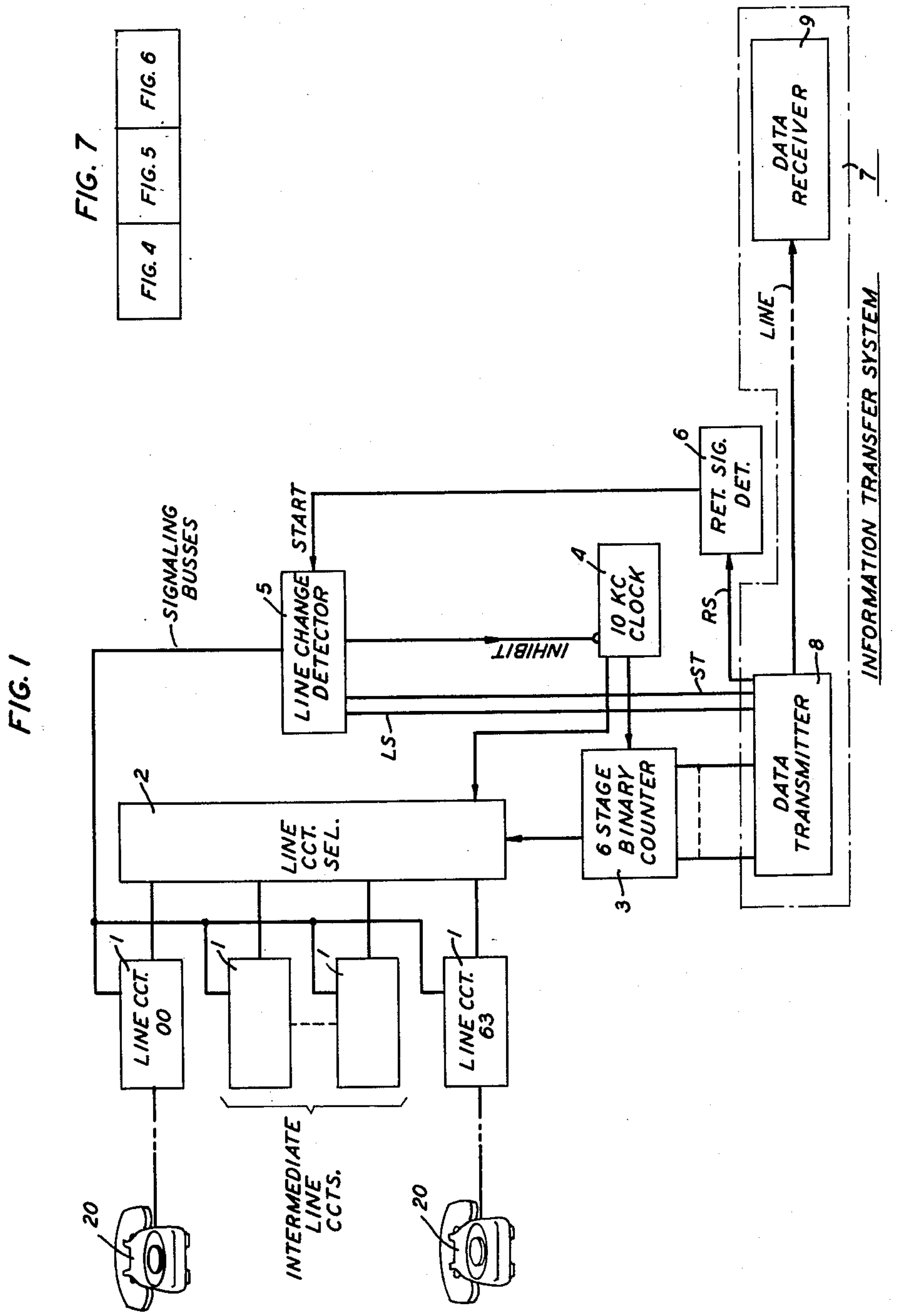
FIGS. 1 and 3 are block diagrams in varying detail of one specific embodiment of the invention.
Figure 3:
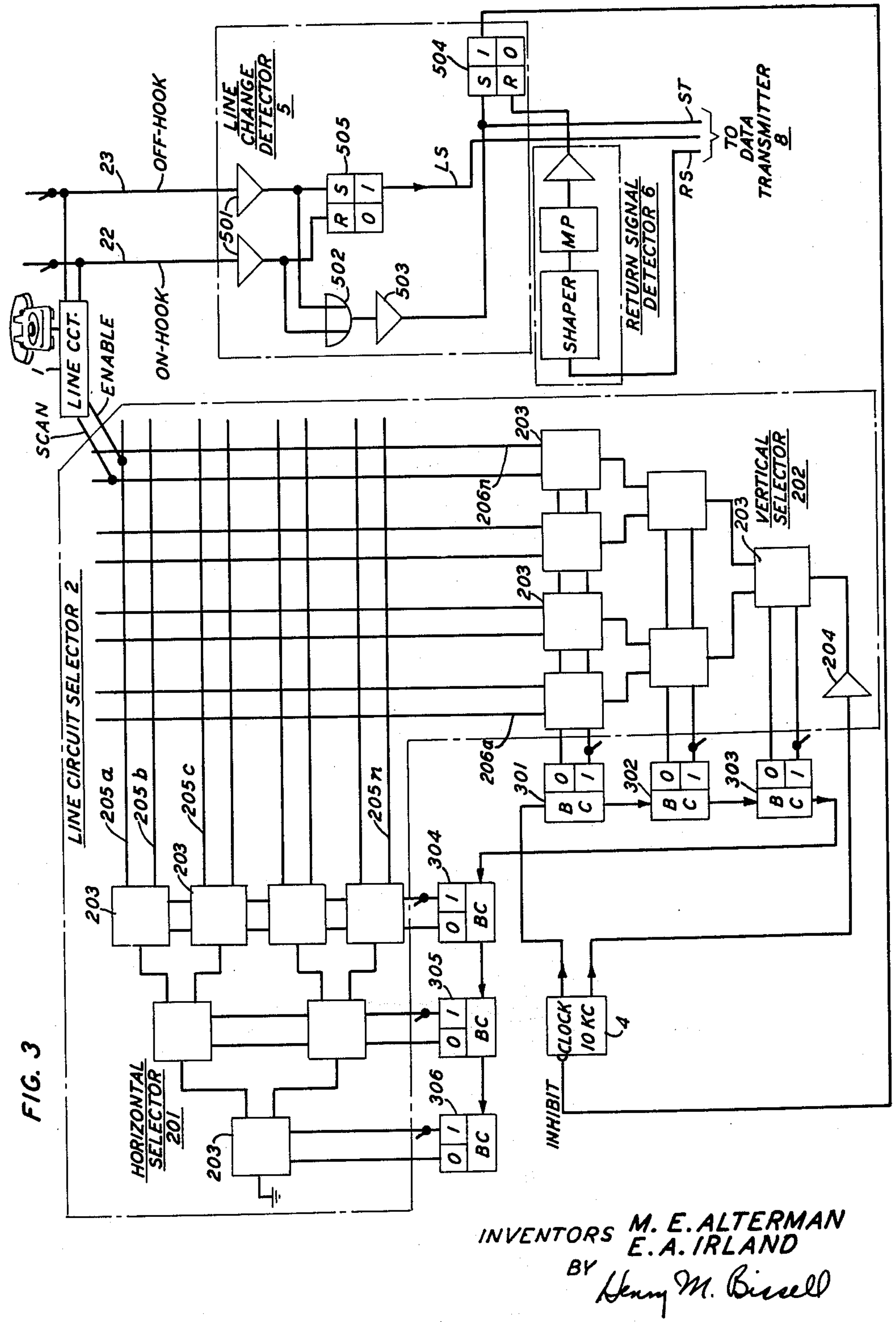
Figure 4:
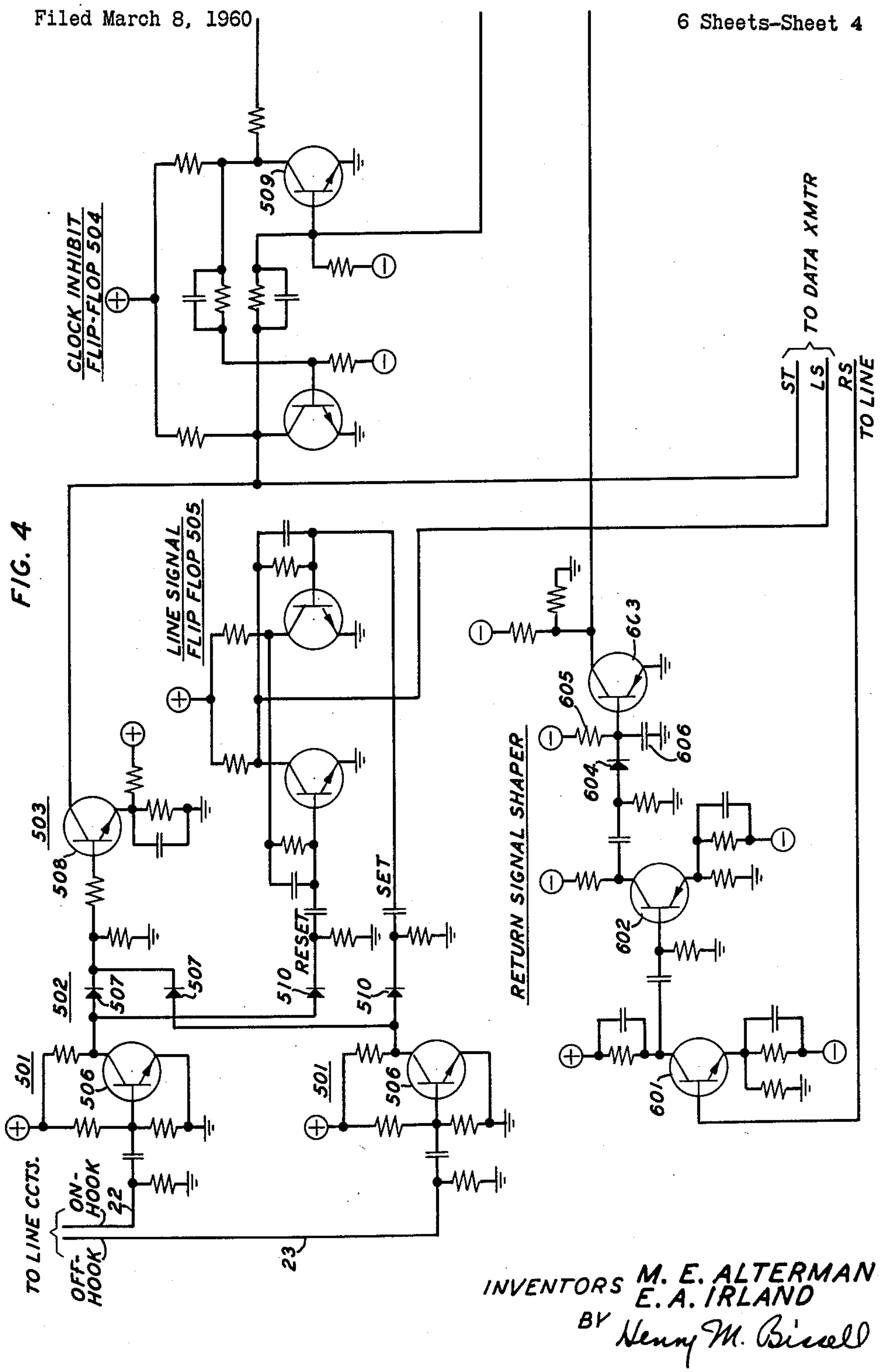
Figure 5:
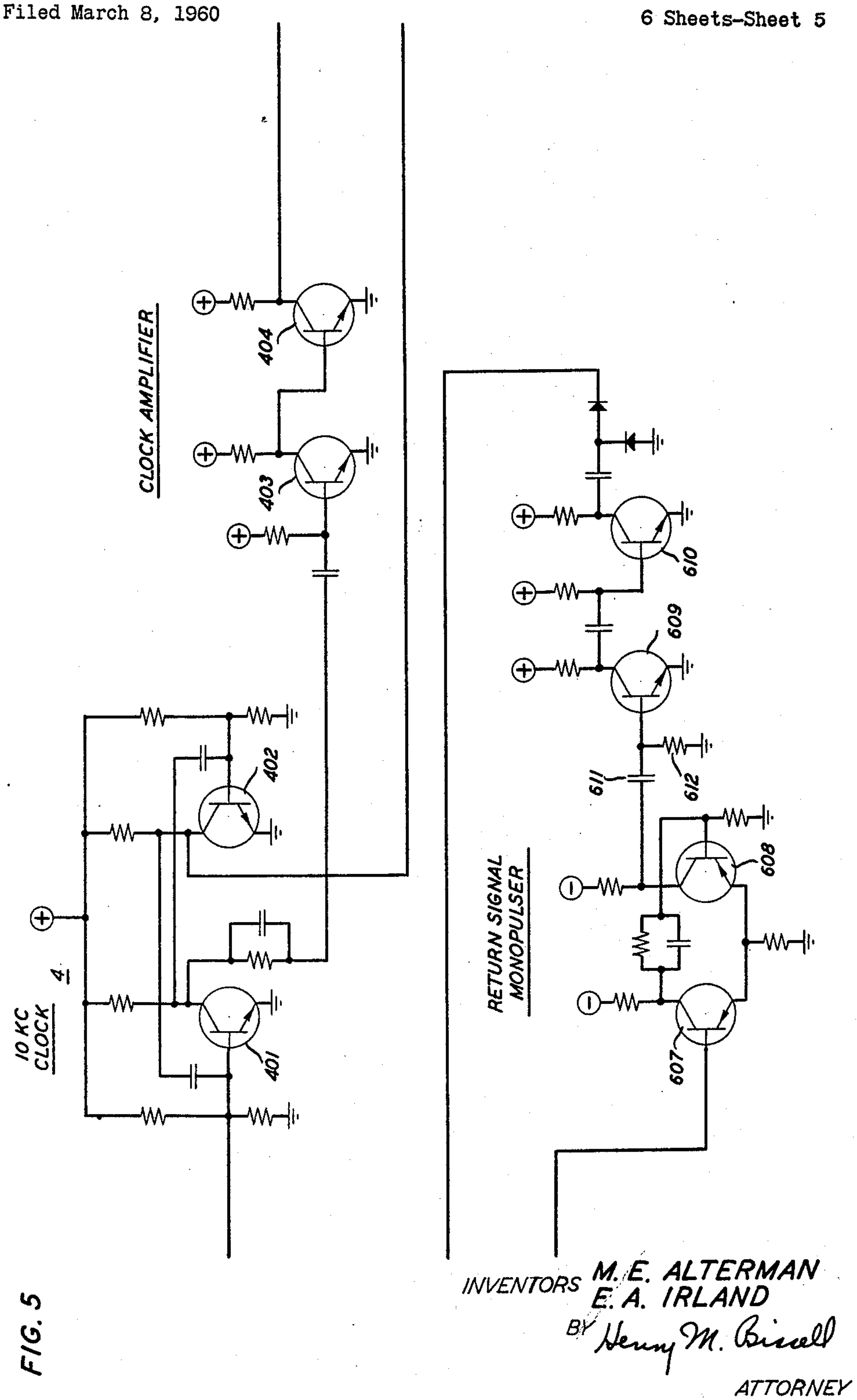
Figure 6:
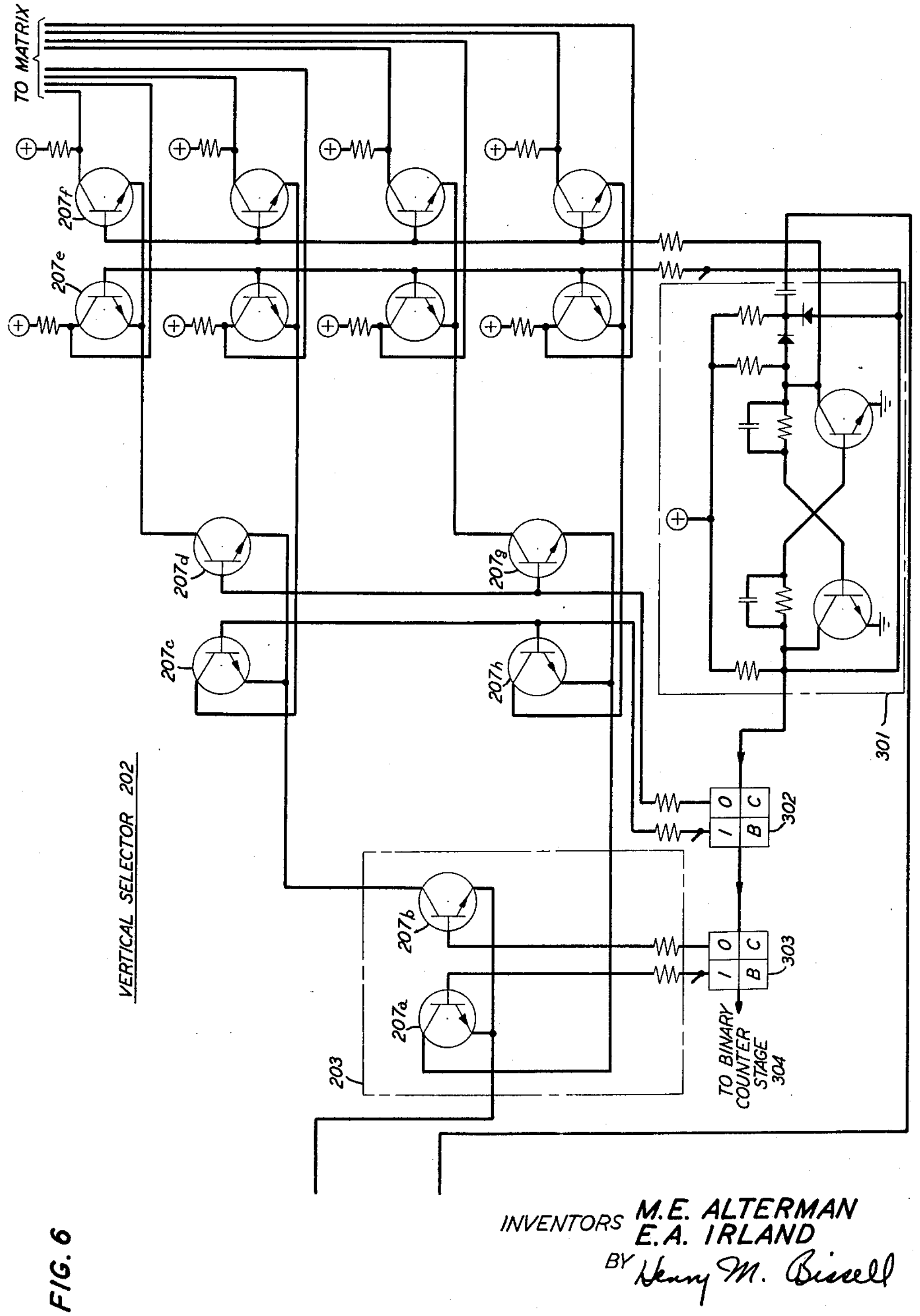

FIGS. 4, 5, and 6 together depict schematically the embodiment of FIGS. 1 and 3; and FIG. 7 shows the relative positions of FIGS. 4, 5, and 6.

In FIG. 1, one specific embodiment of the invention is shown in combination with associated circuitry to which it is connected. A plurality of line circuits 1, each of which may be understood to be connected to a corresponding subscriber telephone subset 20, are connected to a line circuit selector 2. The line circuit selector 2 is driven by a binary counter 3 and a clock 4 which also controls the binary counter 3. The output of the selector 2 is directed to a line change detector 5 which is also connected to the clock 4. A return signal detector 6 is arranged to apply a signal to the line change detector 5. Various leads are connected from the binary counter 3, the line change detector 5 and the return signal detector 6 to an information transfer system 7 such as is disclosed in the above-cited copending Irland application, which system may be considered to comprise a data transmitter 8 and a data receiver 9, the latter being associated with central office common control equipment (not shown).

The depicted specific embodiment of this invention utilizes a binary counter of six stages to drive a line circuit selector associated with sixty-four line circuits. It will be understood, however, that a larger number of circuits might be scanned by increasing the number of stages in the binary counter and enlarging the line circuit selector in a manner known to those skilled in the art. Furthermore, the ten kilocycle clock frequency selected in the operation of this specific embodiment of the invention is not critical and may be modified as known in the art without departing from the scope of the invention.

Figure 2:
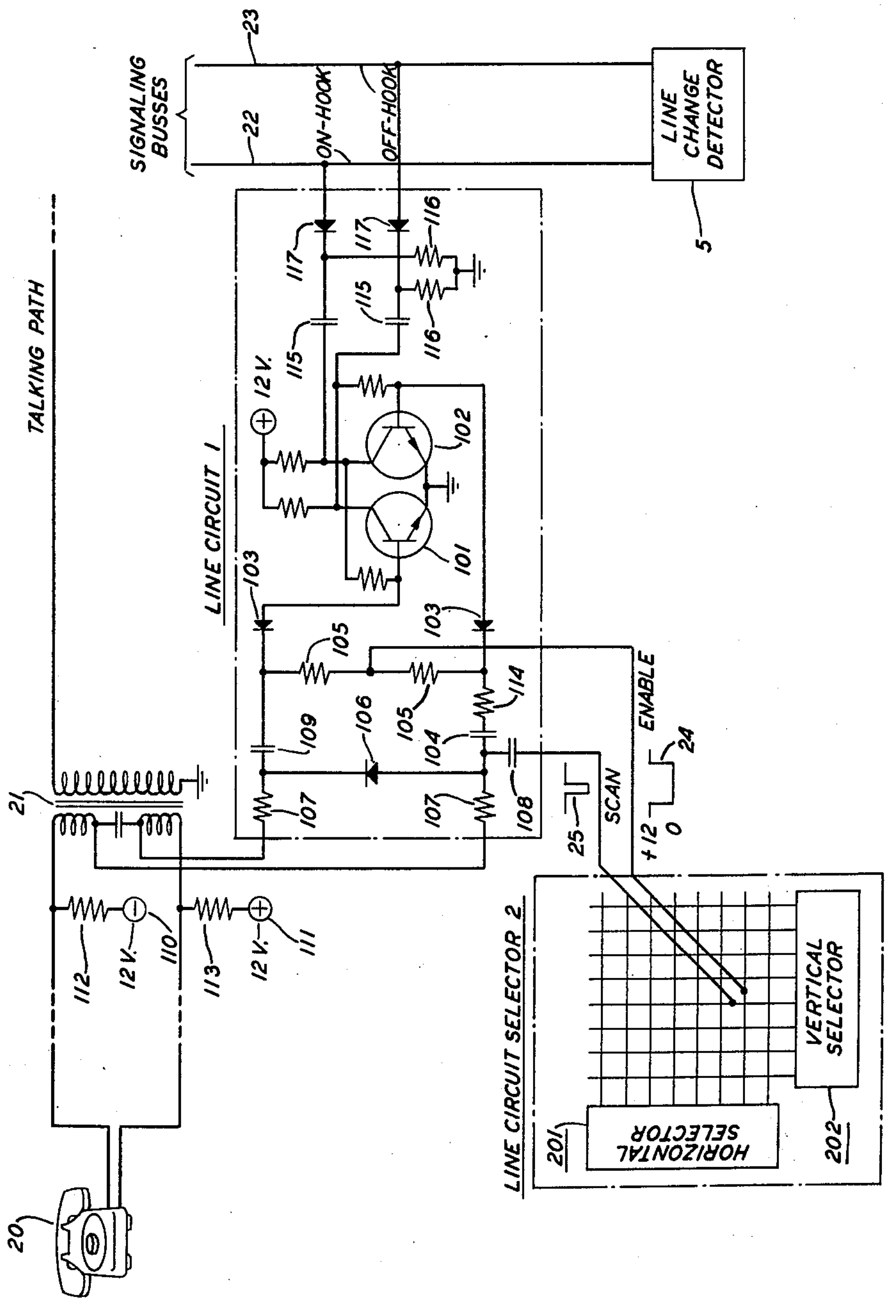
FIG. 2 illustrates schematically a portion of the embodiment depicted in FIGS. 1 and 3.

FIG. 2 depicts schematically a typical line circuit 1 of FIG. 1 together with certain auxiliary components which are included for completeness. In FIG. 2 the line circuit 1 is shown connected to a telephone subset 20 through windings of a transformer 21 which is also connected to a talking path. Since this invention is concerned solely with a portion of the system control network, the talking path connection will not be discussed further. The output leads of the line circuit 1 are connected respectively to two signaling busses 22 and 23 which are also connected to other line circuits not shown in this figure and to the line change detector 5. Connections are also provided between the line circuit 1 and the line circuit selector 2.

The line circuit 1 comprises a pair of transistors 101 and 102 connected together with appropriate resistors and potential sources to provide a symmetrical flip-flop arrangement as is known in the art. Each input signal path includes a rectifier 103 which serves as a trigger signal gate. The upper signal path also includes a capacitor 109 while the lower signal path has a capacitor 104 and a resistor 114. Between the two rectifiers 103 are connected a pair of resistors 105, the midpoint of which is connected to the Enable lead from the line circuit selector 2. Between the two capacitors 104 and 109 is connected a reverse breakdown diode 106 to which the telephone subset is connected through resistors 107. The common connection of the capacitor 104 and the reverse breakdown diode 106 is attached to the Scan lead from the line circuit selector 2 by means of the capacitor 108. Voltage sources 110 and 111 apply potentials to the telephone line through resistors 112 and 113. The collectors of the transistors 101 and 102 are respectively connected to capacitors 115, resistors 116, rectifiers 117 and finally the busses 22 and 23.

The reverse breakdown diode 106 can be considered to be a part of two separate circuits. The first includes the potential sources 110 and 111, the resistors 112, 113, and 107 and two windings of the transformer 21. The second circuit comprises the input signal path for the transistor 101 including the capacitor 109 and the rectifier 103 to which Scan pulses such as the pulse 25 are applied through the reverse breakdown diode 106.

In the line circuit selector 2 signals are applied to selected coordinates of the matrix. The Enable pulse 24 from the horizontal selector 201 applies ground to the common point between the resistors 105 in the line circuit 1, thus removing the back-bias normally applied to the rectifiers 103. Within the duration of the Enable pulse 24, the Scan pulse 25 is applied through the capacitor 108 to the capacitor 104 and to the reverse breakdown diode 106. Let us assume that the subset 20 is in the on-hook condition and has been so, for at least a scan period. The values of the resistors 112, 113, and 107 are such that in this condition the voltage sources 110 and 111 apply a voltage to the reverse breakdown diode 106 which exceeds its threshold potential; therefore, diode 106 is in its low impedance state.

When the Scan pulse 25 is applied, it passes in parallel over the two input signal paths of the transistors 101 and 102. In accordance with an aspect of this invention, the values of the capacitors 109 and 104 and of the resistors 114 and 105 are arranged to establish a longer time constant for the upper path than for the lower path. Furthermore, the signal along the lower path is reduced in amplitude by the voltage drop across resistor 114. Thus in response to the Scan pulse 25 both input leads of the transistors 101 and 102 are triggered together, but the pulse applied along the upper path is longer in duration and slightly greater in amplitude than that applied along the lower path because of the respective path circuits just described. Thus the line circuit 1 is always left after the termination of the Scan pulse 25 with the transistor 101 in the non-conducting condition whenever the reverse breakdown diode 106 is in its low impedance state.

Assume now that the subset 20 is changed to the off-hook condition; this subset 20 now draws sufficient current from the sources 110 and 111 through the resistors 112 and 113 to reduce the voltage applied across the breakdown diode 106 below its breakdown potential and the diode 106 assumes its high impedance state. The breakdown diode 106 then presents its shunt capacitance of approximately 100 micromicrofarads in series with the upper signal path including the capacitor 109. This small series capacitance materially reduces the time constant of the upper path so that it now becomes less than that of the lower path including the capacitor 104. With the breakdown diode 106 in its high impedance state, the Scan pulse 25 applied concurrently with the Enable pulse 24 produces a trigger signal at the transistor 102 which is longer in duration than that which it produces at the transistor 101. Accordingly, in this case the line circuit 1 is left with its transistor 102 in the non-conducting condition after the termination of the Scan pulse 25. Since this represents a change of state for the line circuit flip-flop comprising the transistors 101 and 102, a negative output signal is developed along the lower output lead and is applied to the signaling bus 23. From there it is directed to the line change detector 5 which responds in a manner which will be described below. This signal on the bus 23 indicates that a change of switch-hook condition has occurred and that the change was from on-hook to off-hook. If the change had been in the opposite direction, namely, from off-hook to on-hook, the transistor 102 would have been changed to the conducting condition, thereby developing a negative signal on the upper output lead of the line circuit 1 which would be applied to the signaling bus 22, indicating that a change in switch-hook condition had occurred in the opposite direction.

In FIG. 3, which depicts the embodiment of FIG. 1 in somewhat greater detail, the line circuit selector 2 is shown comprising a horizontal selector 201 and a vertical selector 202. The selectors 201 and 202 comprise a plurality of transistor stages 203 which are shown in greater detail in FIG. 6. The vertical and horizontal selectors 201 and 202 are connected to respective stages 301 through 306 of a binary counter and differ from each other only in the particular stages thereof to which they are connected and in the connections made to their input terminals. It will be noted that a ground connection is shown attached to the input lead of the horizontal selector 201 whereas the input lead of the vertical selector 202 is connected through an amplifier 204 to an output of the clock 4. A second output of the clock 4 drives the binary counter comprising the stages 301 through 306. As will be described with reference to FIG. 6, the horizontal leads 205 and the vertical leads 206 will be selectively energized under the control of the binary counter stages 301 through 306 and the transistor stages 203 so that only one line circuit will be scanned at any particular time. The coordinate matrix depicted in FIG. 3 serves to scan sixty-four line circuits, one for each of its coordinate pairs of leads, although only one line circuit has been shown for simplicity. Furthermore, since the counter stages 301 through 303 cycle more rapidly than the counter stages 304 through 306, each group of line circuits 1 connected to a particular horizontal lead 205 is scanned by successive signals on leads 206 before the next horizontal row of line circuits is scanned.

When a particular line circuit 1 produces a line change signal on either of signaling busses 22 and 23, this signal is amplified by the appropriate amplifier 501 in the line change detector 5. An amplified signal then goes through an OR circuit 502 and an amplifier 503 to the clock inhibiting flip-flop 504 and to the ST lead of the data transmitter. This signal sets the flip-flop 504 which applies an inhibiting potential to the clock 4, thereby interrupting its operation and maintaining the counter stages 301 through 306 in the condition corresponding to the address of the particular line circuit 1 which has indicated a change of condition.

The "1" output leads of the counter stages 301 through 306 are multipled to the data transmitter 8 of FIG. 1. Thus the particular line circuit address is available at the data transmitter when it receives the Start signal from the amplifier 503. It thereupon proceeds to send this address information to the data receiver 9 of FIG. 1.

The signal applied on either of the signaling busses 22 and 23 produces a corresponding output from the line signal flip-flop 505 which is passed to the data transmitter 8. Accordingly, the information relating to the particular change of switch-hook condition which occurred is transferred by the data transmitter in addition to the line circuit address. When the data receiver 9 is ready for the resumption of scanning it sends back a return signal which is applied to the return signal detector 6 where it is shaped, regenerated and amplified before being applied to the Reset lead of flip-flop 504. The resetting of flip-flop 504 removes the inhibiting voltage from the clock 4 which thereupon resumes the scanning of the line circuits 1.

FIGS. 4, 5, and 6, arranged as shown in FIG. 7, illustrate schematically a portion of the embodiment of the invention depicated in FIGS. 1, and 3. In FIG. 4 amplifiers 501 and 503, OR circuit 502, the line signal flip-flop 505 and the clock inhibiting flip-flop 504 are shown, each comprising circuitry known in the art. A line condition change signal received on either bus 22 or 23 drives the base of the associated transistor 506 negative, thus turning it off and producing a positive signal at the collector thereof. This is applied through a rectifier 507 of the OR circuit 502 to the base of transistor 508 where it turns on transistor 508 and produces a negative signal at the collector thereof. This signal is applied over the ST lead to the data transmitter in order to signal the data transmitter to begin transferring the line circuit binary address as already discussed. The negative signal from the collector of transistor 508 is also directed to the base of previously conducting transistor 509 in flip-flop 504 which thereupon changes state. The resulting positive output from the collector of transistor 509 is then directed to the clock 4 of FIG. 5 to interrupt its operation.

Simultaneously the positive signal at the collector of one of the transistors 506 is directed through the associated rectifier 510 to an input of the line signal flip-flop 505. This causes the flip-flop 505 to produce a potential on the LS lead to the data transmitter which indicates the condition to which the particular line circuit being scanned has changed.

In FIG. 5 there are depicted a clock circuit 4, comprising transistors 401 and 402 arranged in a known astable multivibrator configuration, and a clock amplifier circuit, connected to one output of the clock 4 and comprising transistors 403 and 404 in a known circuit arrangement. The output of transistor 404 is applied to the input of vertical selector 202 depicated in FIG. 6. A second output of the clock 4 is applied to the input of binary counter stage 301 of FIG. 6.

Turning now to FIG. 6, vertical selector 202 comprises a plurality of transistors 207 connected in a selector tree arrangement as is known in the art. These transistors are connected by groups to associated binary counter stages which control the conduction of the corresponding transistors according to the binary number stored in the counter. For example, transistors 207*d* and 207*g* have their bases connected to the "0" output of binary counter stage 302 while transistors 207*c* and 207*h* have their bases connected together to the "1" output of binary counter stage 302. Also connections are provided between transistors of succeeding groups so that one distinct conducting path will exist from input to output of the vertical selector 202 for each of the eight different conditions of the section of the binary counter comprising stages 301 through 303. Counter stage 301 is representative of the counter stages employed in this invention and comprises a bistable circuit known in the art.

For purposes of illustration, let us assume that each of the counter stages 301, 302, and 303 is in the binary "0" condition. This causes the right-hand transistors in each group within the selector 202 to conduct. However, only one conducting path will be provided through the selector, namely, that comprising transistors 207*b*, 207*d*, and 207*f* in series. Negative pulses from the collector of transistor 402 in FIG. 5 drive binary counter stage 301 which is typical of the circuits of the stages 302 through 306 and which in turn drive the succeeding counter stages. On the next half cycle of the clock 4 is a negative signal is produced on the collector of transistor 401 which turns off transistor 403. This turns on transistor 404 and develops a negative Scan pulse on the collector thereof which is applied through transistors 207*b*, 207*d*, and 207*f* to the left-hand vertical coordinate of the matrix. As already described, a similar selector tree 201 connects ground from its input to the appropriate horizontal coordinate of the matrix in accordance with the condition of its associated binary counter stages in order to enable the individual line circuits connected thereto. Thus the line circuit scanning proceeds throughout the matrix and continues on successive cycles until interrupted.

As described above, a signal on either of leads 22 and 23 of FIG. 4 results in a positive signal being applied from the collector of transistor 509 to the base of transistor 401 in the clock 4. Further recycling of the clock 4 is prevented while transistor 509 is in its high impedance condition, thus interrupting line circuit scanning for this interval. Flip-flop 504 remains in the state it assumes upon the occurrence of a signal on lead 22 or 23 until reset by a positive pulse applied to the base of transistor 509. Such a pulse is produced when a return signal is received from the information transfer system as a positive pulse applied to the base of transistor 601 of FIG. 4 in the return signal shaper circuit. Transistors 601 and 602 amplify this pulse which, after lengthening by the network comprising rectifier 604, resistor 605 and capacitor 606, is applied through transistor 603 as a negative pulse to the base of transistor 607 of FIG. 5. Transistors 607 and 608 are connected in a known configuration as a regenerative pulse amplifier, or monopulser, and drive transistors 609 and 610 in a conventional amplifying circuit.

Triggered by the negative pulse to the base of transistor 607, the monopulser develops a signal which is differentiated by the network comprising capacitor 611 and resistor 612. The trailing edge of the output pulse from transistor 608 is then amplified through transistors 609 and 610 and applied to the base of transistor 509 to reset the flip-flop 504. This permits the clock 4 to begin cycling and line circuit scanning is thereupon resumed. The reason for the delay interposed in the return signal network is to insure that associated circuits in the information transfer system of FIG. 1 become restored to normal before scanning is resumed.

It is to be understood that the above-described arrangements are illustrative of the principles of the invention. Numerous other arrangements may be devised by those skilled in the art without departing from the spirit and scope of the invention.

What is claimed is:

1. In a telephone system, means for determining at a central office the condition of a plurality of local subscriber lines remote from said central office comprising a local clock pulse source, a circuit selector, a binary counter connected between said selector and said clock pulse source for directing said selector to the particular line to be scanned in accordance with the designation registered in said counter, bistable means individually associated with each subscriber line and having first and second input paths of distinct time delay, first means for connecting said selector to said bistable means, second means for connecting said bistable means to the corresponding ones of said subscriber lines, means comprising the output of said bistable means for inhibiting said clock pulse source, means for transmitting the line designation registered in said binary counter to said central office, and means for activating said clock pulse source after the transmission of said line designation.

2. In a line scanner for an electronic telephone system, a line circuit comprising bistable trigger means having a pair of input paths, means for establishing individual predetermined time constants for each of said paths, a reverse voltage breakdown device exhibiting a low impedance in a first conducting condition and a small capacitance in a second non-conducting condition inserted in one of said input paths, means for applying a triggering signal to both of said input paths simultaneously, and means for establishing the condition of said breakdown device to vary the time constant of said one input path whereby the ultimate state of said bistable means is responsive to said triggering signal.

3. A line circuit in accordance with claim 2 wherein said breakdown device comprises a reverse voltage breakdown junction diode.

4. A line circuit in accordance with claim 2 wherein said bistable means comprises a pair of transistors connected in a flip-flop configuration having a pair of output leads for indicating the state of said flip-flop.

5. In a line scanner of a telephone switching network, a line circuit comprising bistable means having a pair of input paths, each of said paths having a predetermined time constant, a reverse voltage breakdown junction diode included in a first one of said paths for changing the time constant thereof from one which is greater to one which is less than the time constant of the other of said paths, and means for applying a triggering signal to both of said paths simultaneously to determine the condition of said bistable means in accordance with the impedance condition of said reverse voltage breakdown junction diode.

6. A line circuit in accordance with claim 5 wherein means are connected to said reverse breakdown diode for determining the impedance condition thereof.

7. A line circuit in accordance with claim 5 wherein each of said paths includes a normally back-biased rectifier and means are provided for forward biasing said rectifiers during a predetermined time interval.

8. A line scanning circuit for a telephone communication system comprising a plurality of telephone lines, means for individually determining the circuit condition of said lines, means for applying signals to said line condition determining means in succession, means for indicating a change of line condition, means responsive to said line condition change indicating means for interrupting said signals, and means comprising a recycling, binary counter driven by an astable clock circuit for designating the particular line which changes condition.

9. A line scanning circuit in accordance with claim 8 wherein said signal interrupting means comprises a bistable flip-flop for applying an inhibiting signal to said clock circuit in one condition of said flip-flop.

10. A line scanning circuit in accordance with claim 8 further including pulse generating means for resetting said flip-flop to permit said astable clock to resume cycling.

11. A line scanning circuit in accordance with claim 8 further including orthogonal coordinate connecting means connecting said line condition determining means to said signal applying means and wherein said binary counter comprises a plurality of stages selectively connected to said coordinate connecting means.

12. A line scanning circuit in accordance with claim 11 further including means for enabling particular groups of said line condition determining means in response to selected ones of said binary counter stages.

13. A line scanning circuit in accordance with claim 10 further including output means connected thereto and means for triggering said pulse generating means in response to a signal from said output means, said line designating means including means for transferring the binary address of said particular line which changes condition to said output means.

14. A line scanning circuit in accordance with claim 8 wherein said line condition determining means comprises a multistate element exhibiting a small capacitance in one state and a low resistance to direct current in another state.

15. A line scanning circuit in accordance with claim 14 wherein said element comprises a reverse voltage breakdown diode.

16. A line scanning circuit in accordance with claim 15 wherein said line condition determining means also comprises a signal path including said reverse voltage breakdown diode and having a first predetermined time constant with said diode in said low resistance state and a second predetermined time constant substantially reduced from said first time constant with said diode in said small capacitance state.

17. An electrical circuit for ascertaining the condition of a subscriber subset comprising a source of scanning pulses, a source of bias voltage, a reverse voltage breakdown diode connected to said bias voltage source and to said scanning pulse source, a bistable multivibrator having a pair of input leads, delay means connecting each side of said breakdown diode to a corresponding one of said input leads, said delay means having different periods of delay for pulses from said pulse source, and means for changing the impedance condition of said breakdown diode to modify the period of delay for said pulses through said breakdown diode and one of said delay means.

18. A line scanning circuit for a telephone switching system comprising a plurality of line circuits serving a plurality of telephone subscriber lines, means in each of said line circuits for ascertaining the condition of the associated subscriber line, means for indicating a change of said condition, means for scanning said line circuits by applying signals to succeeding ones thereof, means for detecting said line condition change indication, and means responsive to said detecting means for causing said scanning means to designate the line changing condition.

19. A line scanning circuit for a telephone switching system comprising a plurality of telephone lines, a plurality of line circuits individually associated with said lines for indicating a change of condition therein, means for applying pulses in succession to said line circuits, detecting means for inhibiting said pulse applying means upon an indication of said change of condition, output means, means for designating to said output means a particular line undergoing a change of condition, and means for enabling said pulse applying means upon the occurrence of a return signal from said output means signifying the reception of said line designation.

20. A line scanning circuit in accordance with claim 19 wherein said line circuits comprise a bistable means having dual input paths of predetermined time delay, means for directing said pulses to both of said paths simultaneously, and means responsive to the condition of said associated line for varying the time delay of one of said paths to establish a state in said bistable means in response to said pulses which corresponds to said line condition.

21. A line scanning circuit in accordance with claim 20 wherein said time delay varying means comprises a reverse voltage breakdown diode connected in series with one of said paths.

References Cited in the file of this patent

UNITED STATES PATENTS 2,853,553 Almquist et al. ---------- Sept. 23, 1958